United States Patent [19]
Beam

[11] Patent Number: 6,144,158
[45] Date of Patent: *Nov. 7, 2000

[54] ADAPTIVE/ANTI-BLINDING HEADLIGHTS

[75] Inventor: Norman E. Beam, Charlottesville, Va.

[73] Assignee: Sensci Corporation, Alexandria, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,312

[22] Filed: Nov. 7, 1996

[51] Int. Cl.[7] .............................. B60Q 1/02; H05B 37/02
[52] U.S. Cl. ......................... 315/82; 307/10.8; 250/208.1
[58] Field of Search ................................ 362/466; 349/1,
349/56; 315/363, 76, 77, 82; 307/9.1, 10.1,
10.8; 250/208.1

[56] References Cited

U.S. PATENT DOCUMENTS

| | | | |
|---|---|---|---|
| 5,065,288 | 11/1991 | Broggelwirth | 362/61 |
| 5,171,082 | 12/1992 | Watanabe | 362/61 |
| 5,329,206 | 7/1994 | Slotkowski et al. | 315/159 |
| 5,331,251 | 7/1994 | Marois | 315/82 |
| 5,351,151 | 9/1994 | Levy | 359/240 |
| 5,469,340 | 11/1995 | Heizmann | 362/66 |
| 5,550,677 | 8/1996 | Schofield et al. | 359/604 |
| 5,694,182 | 12/1997 | Mitsuoka et al. | 349/1 |
| 5,796,094 | 8/1998 | Schofield et al. | 250/208.1 |

*Primary Examiner*—David H. Vu
*Attorney, Agent, or Firm*—Jones, Tullar & Cooper, PC

[57] ABSTRACT

This invention relates to the production of a beam of light comprised of many microbeams, controlled by incoming radiation, employing a sensor to determine the location of light sources forward of the apparatus and using that information to control the intensity, and/or the angular position, of one or more narrow-angle microbeams, which are part of a large number of beams comprising the overall output beam.

6 Claims, 7 Drawing Sheets

ADAPTIVE/ANTI-BLINDING HEADLIGHTS

BACKGROUND OF THE INVENTION

1. Field of the Invention

The present invention generally relates to a method and apparatus for automatically reformatting the pattern of a beam from a light source to prevent it from illuminating certain areas in the vicinity of a light forward of it; more specifically, to a headlight with an output comprising a multiplicity of microbeams projecting a composite beam of light in the forward direction, whereby the direction of an incoming beam of light impinging on the forward projecting headlight will be sensed by sensors controlling the individual microbeams to darken those microbeams that would otherwise illuminate areas near to the source of the impinging beam, thus eliminating the blinding of a driver in an oncoming vehicle, while continuing to provide intense forward illumination.

2. Description of the Prior Art

One of the problems exhibited by existing headlights lies in the fact that the headlight operates in only one of two modes, either as a "high beam" or as a "low beam." A driver on an open road who sees no oncoming vehicles' headlights or preceding vehicles' taillights will usually operate the headlights on the high beam setting. As another vehicle is overtaken or is approaching, the driver will switch the headlights to the low position. This is required by law, as well as by common courtesy and good sense, to reduce the possibility that other drivers will be dazzled by the light. There have been automatic systems to relieve the driver of the task of switching the modes. In cities, and on busy rural roads, the driver may never be able to switch to high beams, and, thus, will be driving with a handicap at all times.

There are numerous potential problems with the arrangement described above. First, the driver may fail to switch to low beams through neglect, absent-mindedness, or caprice. This causes the drivers ahead, whether they are leading the car being described or are approaching, to be dazzled. Second, even if the driver does switch his lights to low beam, the drivers forward of him may still be dazzled on occasion. Some of those who are especially sensitive may find that the light from even properly operating low beams causes them discomfort and reduces their ability to see at night. Glare is a particular problem with certain classes of drivers; e.g., the elderly. Third, when a car is not level, as when it is overloaded in the rear or when it is cresting a hill, the central rays of the beams of its headlights are raised or lowered with respect to the road's surface and may cause glare even to a driver with normal vision. Fourth, headlights on automobiles frequently are misaligned either because of a slight jar or bump, or simply because vibrations of the vehicle shift their adjustments.

From the driver's perspective, the low beam's illumination is often so dim that it is difficult to see street signs, terrain features, obstructions or potholes in the road, even pedestrians, bicyclists or animals. Yet under many circumstances, it is impossible to use the high beams, even momentarily, without causing problems to other motorists.

Attempts to solve these problems have fallen into several categories: Systems that sense oncoming headlights and cause the automobile with the system to switch to the low beam mode; systems which attempt to control the intensity profile of the beam by using a reflector or lens shaped to control the output beam in some predetermined way; systems to move the headlamps in response to changes that occur to the automobile on which they are mounted; e.g., a tilt sensor used to determine whether loading causes the headlights to point skyward controlling a servo to change the elevation angle of the lamps, movement of headlight beams in response to changes in the vehicle's steering mechanism, etc.; and systems which employ polarizers in the headlight and a cross polarizer in the windshield.

However, these heretofore known devices have exhibited the following problems and shortcomings:

(a) Automatic headlight dimming devices are well known in the art. For example, the device described in U.S. Pat. No. 5,329,206 addresses the issue of driver forgetfulness or inattention, but fails to deal with the other problems listed above.

(b) Controlling of the shape and direction of the headlight beams is generally taught in U.S. Pat. Nos. 5,065,288; 5,171,082; and 5,469,340; but all are passive devices which shape the beam(s) in a predetermined profile that is expected to cause the fewest problems to the oncoming drivers under a variety of circumstances. This is a compromise, at best, between reducing glare and providing enough light to the driver for adequate visibility. Moreover, under many conditions, the driver ahead is not in the area of reduced light intensity, such as when on an uneven surface, when the driver fails to lower the beams, or when there is a misalignment of the headlamps mounted on the car.

(c) Still another apparatus that steers the overall beam downward or upward is described in U.S. Pat. No. 5,331,251 whereby the elevation angle of the headlights is changed in response to variations in vehicle attitude. This is accomplished by sensing its headlight reflections from the road. Even though it can sometimes compensate for changes in loading, spring sag, and the like, depending on the positions of the sensed portions of the roadway, it may not correctly sense the change in effective beam position that occurs when cresting a rise on a wavy road. In fact, examination of the mode of operation suggests that, in some cases, it may even exacerbate the problem for the oncoming driver.

(d) A polarization approach has been advanced as a solution to at least some of the described problems, which requires the driver to wear polarized spectacles or to have a polarized windshield. This will reduce the intensity of the visual clues one receives from ambient light along with the reduction in headlight glare. Implementation would require that all vehicles and/or drivers be equipped with some type of polarizing means, which would be highly impractical.

SUMMARY OF THE INVENTION

The instant invention solves all of the enumerated problems by automatically sensing the presence and location of headlights and taillights ahead of the car on which it is mounted. It will then control the light output of a group selected from a multiplicity of narrow angle beams (microbeams) which comprise the overall headlight beam pattern. By controlling an area determined by analyzing the position of the lights sensed ahead, the area of the beam that would dazzle the driver w ill be darkened, while maintaining fall intensity elsewhere. This can be done for any number of vehicles that fall in the headlight beam pattern. The sensor will be co-located with the light source so that errors in alignment are automatically compensated. The resulting intensity that the leading or the oncoming driver would see can be made to be significantly less than with current low beams, although enough brightness would remain to enable the driver approaching the car with the improved system to locate it.

Moreover, it is obvious that such a light is not limited to automotive applications. Clearly, it would be useful in marine lighting, and also in certain fixed lighting where, say, a spotlight was to be aimed down a driveway, etc.

Accordingly, several objects and advantages of this invention are to provide greatly improved safety and comfort to the motoring public, in particular, and to others who may be affected by them by providing the driver of an automobile equipped with the instant invention with a far brighter headlight beam while simultaneously protecting the drivers of all vehicles ahead from being dazzled by the light.

A further object of the present invention is to provide the benefit of reduced glare to drivers of automobiles whether or not their vehicles are equipped with the Adaptive Anti-Blinding Headlights (AABH) system.

Yet another object of the present invention is to provide enhanced vision to the driver of a vehicle equipped with the Adaptive Anti-Blinding Headlights system through a much higher brightness beam in the areas which do not dazzle the drivers ahead.

Another object of the present invention is to provide an illuminaire that can be used in a fixed location to illuminate an area where vehicles are present to accord them the same glare reduction cited above.

Still another object of the present invention is to provide the driver with a system that usually needs no intervention to manually dim or restore the bright light mode. (An override could be provided to allow the driver to activate the high beams to signal another driver or in the case of a failure of the AABH system. It will also be possible to manually lower the beams for conditions like rain, snow, or fog, and again, as a backup in case of ABC system failure.)

The primary advantage of the present invention over the prior art is that it produces a beam of high intensity light that enables the driver to see more clearly at night, while simultaneously protecting drivers in front from dangerous glare. This will contribute to the safe operation of both the AABH-equipped vehicle and others ahead, whether so equipped or not. It will also increase the comfort of drivers of all vehicles involved.

DETAILED DESCRIPTION OF A PREFERRED EMBODIMENT OF THE INVENTION

Figures 1, 1A, 1C:
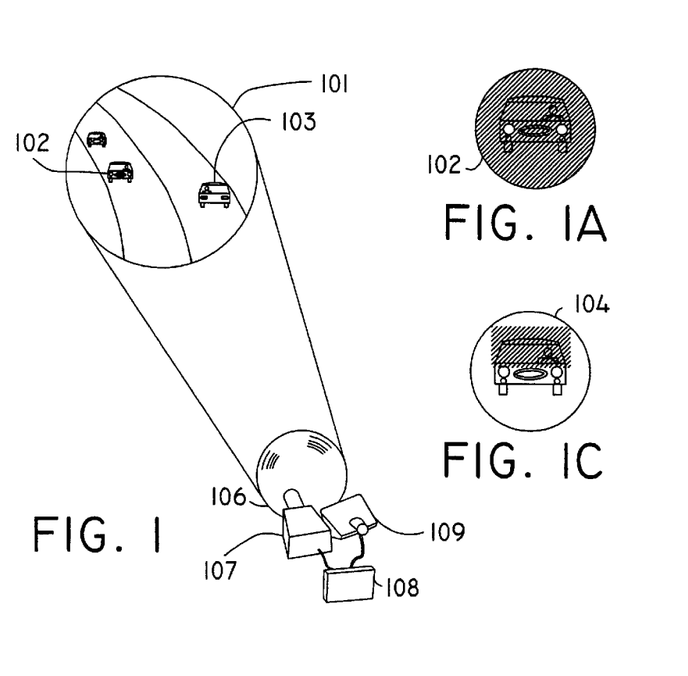
FIG. 1 illustrates the overall system concept of an Automatic Beam Control System in accordance with the present invention.
FIGS. 1A and 1B illustrate an oncoming vehicle and a vehicle being followed, respectively, within the range of an imaging sensor in the control system of FIG. 1.
FIGS. 1C and 1D illustrate areas of reduced illumination produced by the control system of FIG. 1.
Figure 1B:
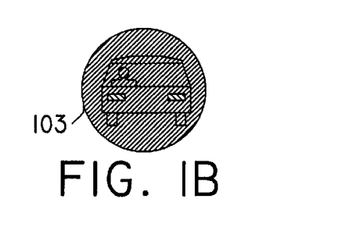
Figure 1D:
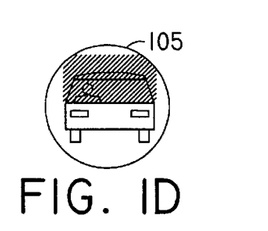

Referring now to the drawings, and more particularly to FIG. 1, there is shown the concept of the Adaptive Anti-Blinding Headlights system wherein the headlights of an oncoming vehicle and/or taillights of a vehicle ahead are transmitted through an optical system 106 mounted at a headlight on the Adaptive Anti-Blinding Headlights-equipped vehicle, and detected by a sensor 107. Data from sensor 107 are input to a controller 108, which uses them to determine which microbeams must be reduced in intensity to protect the other drivers. These data are used to control an illuminator 109, which then projects the light through optical system 106 to illuminate an area shown as 101. The vehicles shown in various circles 104 and 105 correspond to the vehicles in circles 102 and 103 with the illumination in the shaded areas being reduced significantly to protect the vision of the oncoming drivers.

Figure 2:
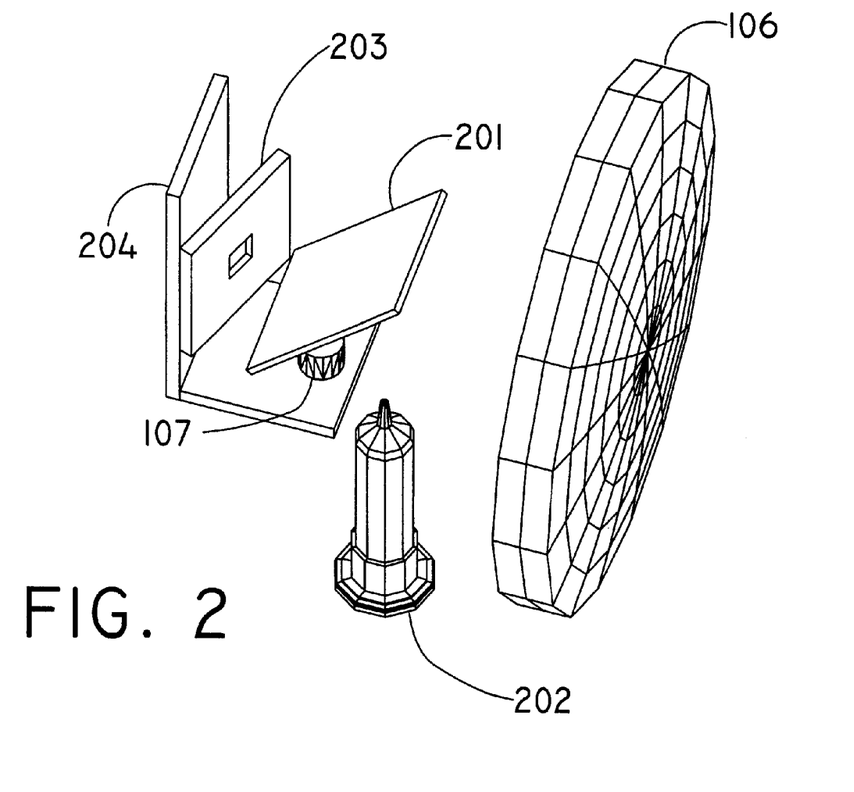
FIG. 2 illustrates the component layout of an Automatic Beam Control system.

FIG. 2 shows a perspective view of an embodiment of the invention. Rays from the scene come in through optical system 106. A portion of these rays is reflected by a beamsplitter 201 to sensor 107 which is illustrated as a camera in this embodiment. Beamsplitter 201 shown is not absolutely essential; it is used to eliminate parallax, but the camera could be used independently as shown in FIG. 1. The incoming rays are imaged by the sensor 107 and are converted to video or other electrical signals used to drive controller 108, which uses the data to determine the particular area of microbeams to be blanked. Rays from a lamp 202 fall on the surface of a spatial light modulator 203, mounted on a support 204, where they are either reflected through or blanked (attenuated by being either absorbed or deflected to an absorbing surface.) If reflected, they pass through beamsplitter 201 and out optical system 106. Thus we produce an overall beam pattern comprising many (in this embodiment, ~300 000) individual narrow-angle microbeams of light, as contrasted with conventional headlights, which produce only a single beam. These microbeams are arranged in an X-Y matrix. The angular position or attenuation of each of these microbeams is independently set by the controller 108. Controller 108 selectively commands reduction of the energy of the microbeams falling on a particular object or objects. Specifically, the eyes of oncoming or, when reflected by their rear-view mirror, the eyes of drivers being followed.

To accomplish this, the spatial locations of the sources are mapped into controller 108 which then commands spatial light modulator 203 in illuminator 109 to either divert the selected microbeams or to attenuate them, depending on the implementation of spatial light modulator 203 chosen. The resulting beam is at full intensity except in areas that would dazzle a driver ahead.

Figure 3:
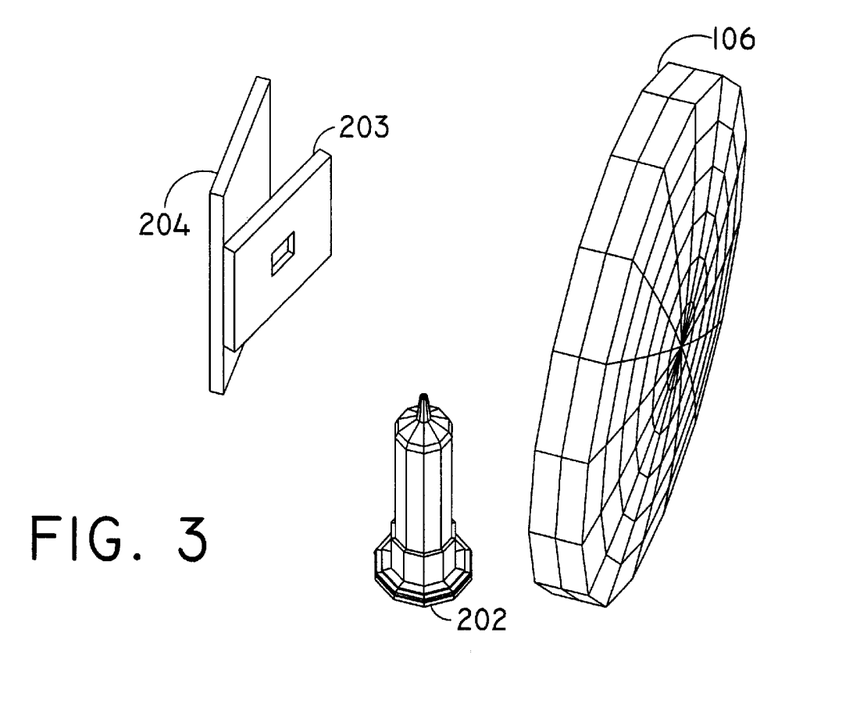
FIG. 3 illustrates the same concept as FIG. 2, except that the imaging sensor is replaced by an optical or radio frequency radar sensor.

FIG. 3 illustrates a similar system to that of FIG. 2, except that a radar sensor 301 of either the optical or radio frequency type replaces the imaging sensor. The output and reflected wavefronts are used to determine range and angular position of the vehicles ahead in the usual manner. The output drives controller 108, of FIG. 1, which uses range data to determine size and azimuth/elevation data to determine the position of the area of the microbeams to be dimmed. The remainder of the operation is the same as described in the discussion of FIG. 2.

Figure 4:
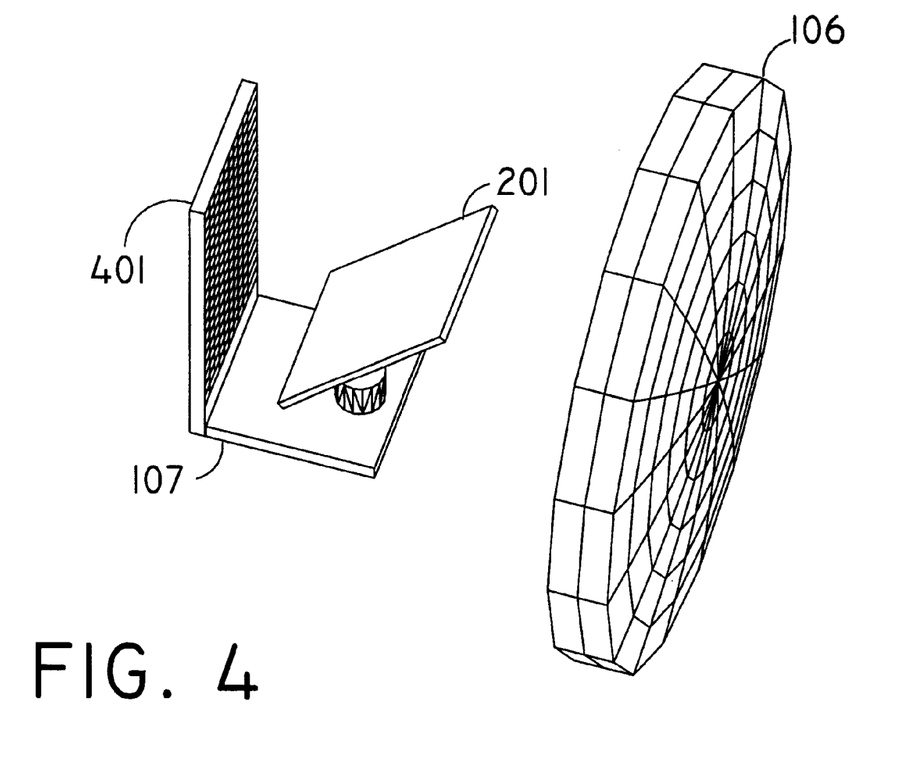
FIG. 4 illustrates the same concept as FIG. 2, except that the light source and the spatial light modulator are replaced by an array of individually controlled light sources.

FIG. 4 depicts a system similar to that of FIG. 2 except that the lamp 202 and spatial light modulator 203 are replaced by an array of light sources 401 which are individually controlled. This array could be implemented a number of ways: it could be an addressable matrix of lasers; it could be an array of incandescent filaments; or it could be some other similar arrangement of emitters. The rays from the scene come in through optical system 106. Some of the rays are reflected by beamsplitter 201 to sensor 107. They are imaged by the sensor and are converted to video or other electrical signals. The output drives controller 108, which uses the data to determine the size and position of the light emitters to be dimmed. The output of the active emitters is projected through optical system 106.

Figure 5:
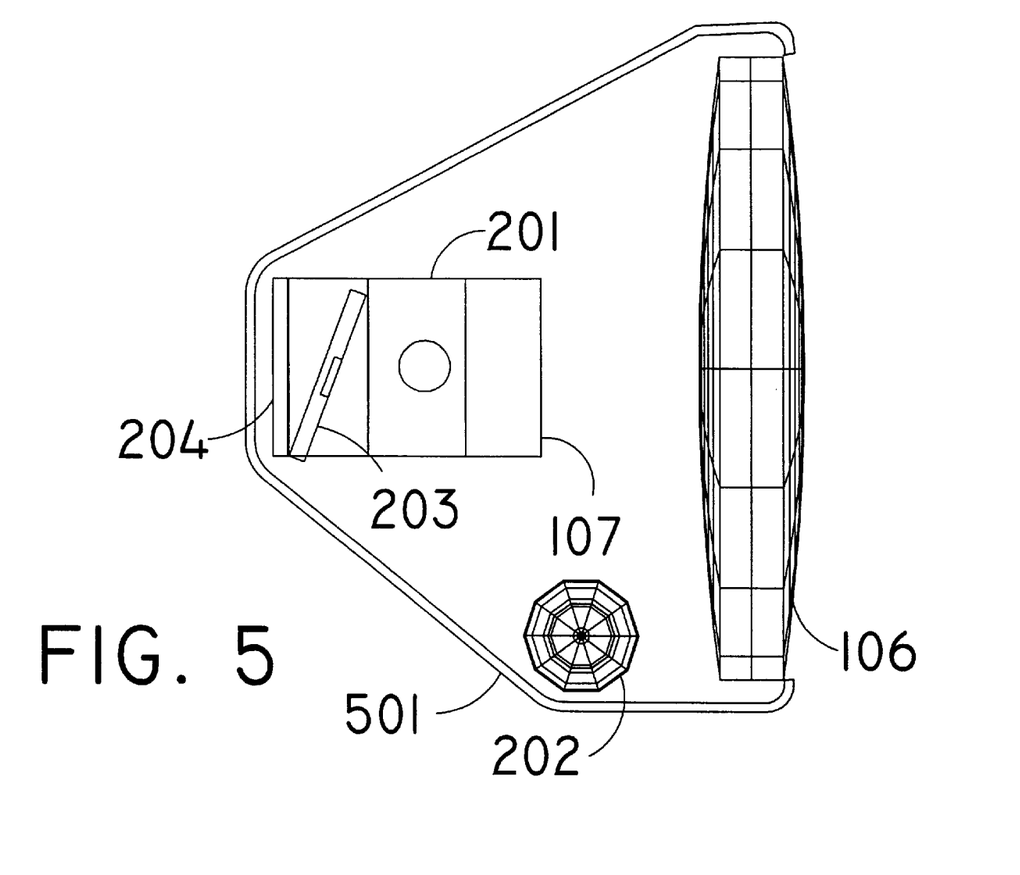
FIG. 5 is a top view of an Automatic Beam Control module, with an illuminator comprising a lamp with spatial light modulator.

FIG. 5 shows a top view of an Automatic Beam Control module. It is similar to FIG. 2, except that an illuminator comprising lamp 202 and spatial light modulator 203, sensor 107, and optical system 106 are mounted to a unitized housing 701. Said unitized housing might be a single glass envelope which would provide both protection from the environment and mechanical support for the components as shown, or it could be an assemblage of support components with a separate mechanical support system. The required function is to support the components to maintain optical alignment.

Figure 6:
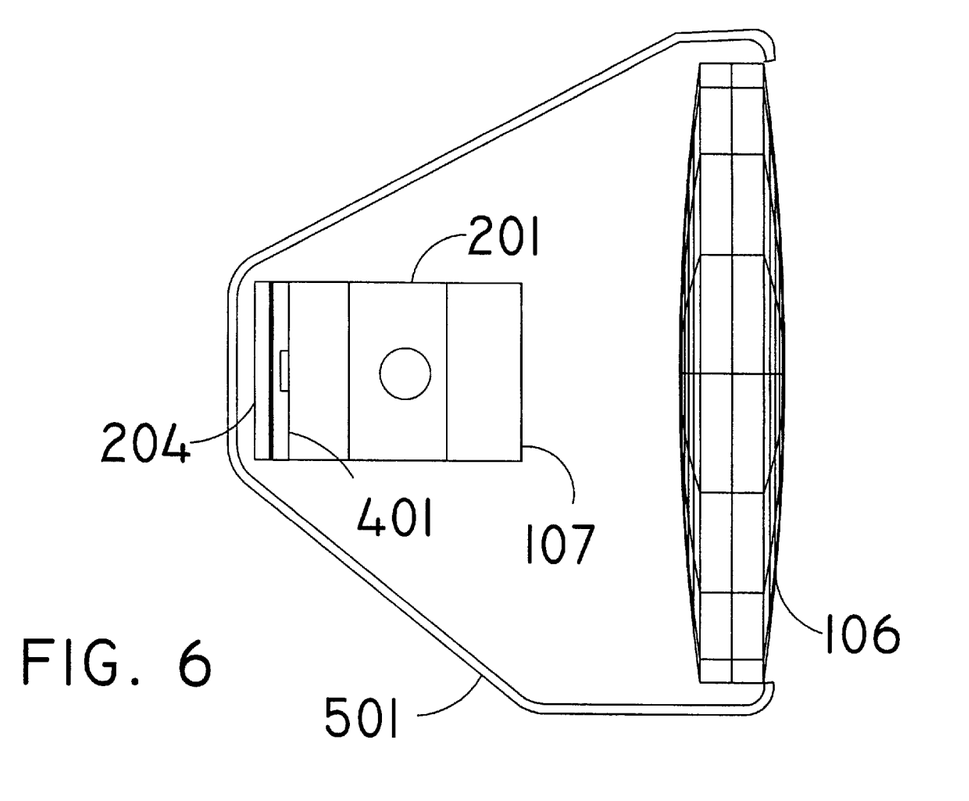
FIG. 6 is a top view of an Automatic Beam Control module, with an array of light sources.

FIG. 6 is a top view of an Automatic Beam Control module, where there is shown an array of light sources 401, a sensor 107, and an optical system 106 mounted to a unitized housing 701.

Figure 7:
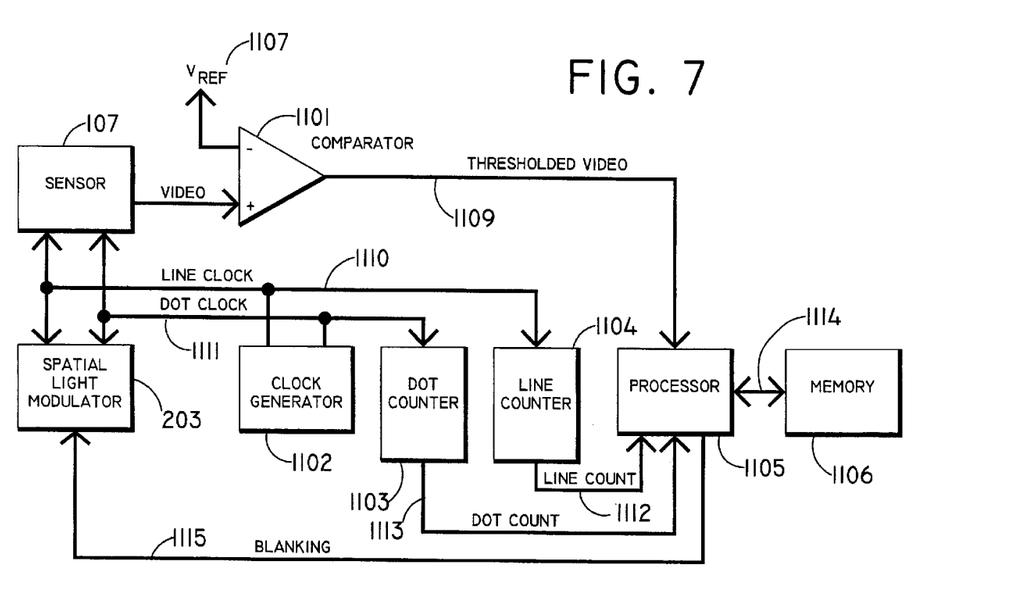
FIG. 7 is a block diagram of a controller, where there is shown circuitry and its relation to a sensor and a spatial light modulator.

FIG. 7 is a block diagram of the electronics portion of controller 108. The spatial scene data from sensor 107 is thresholded to eliminate weak signals and becomes the input to a processor 1105. A clock generator 1102 produces a line clock which determines the line to be read or illuminated, and a dot clock, which determines the location of the pixel on the line to be read or illuminated. The dot clock output is connected to sensor 107, spatial light modulator 203 and a dot counter 1103 via a bus 1111. The line clock output is connected to sensor 107, spatial light modulator 203 and a line counter 1104 via a bus 1110. The numeric value of dot counter 1103 is transferred to processor 1105 via a bus 1113. The numeric value of line counter 1104 is transferred to processor 1105 via a bus 1112. Processor 1105 uses appropriate algorithms on the incoming data to determine the locations to be blanked, and stores them in memory 1106. While the next frame of data is being acquired, processor 1105 retrieves the location data and outputs blanking signals at the appropriate times, based on the contents of dot counter 1103 and line counter 1104. The blanking signals are carried on blanking bus 1115 to spatial light modulator 203. This commands the appropriate pixels to be reduced in intensity.

OPERATION OF PREFERRED EMBODIMENT OF INVENTION

The following description will include an operational explanation of the details previously discussed in this present invention.

In operation, the AABH produces a multiplicity of individually directed narrow-angle beams which are herein referred to as microbeams, each being controlled by a processor responsive to incoming data from an imaging sensor. Any microbeams that would blind the oncoming driver are diverted or attenuated at the source. Selection of the particular microbeams that form the dimmed area is performed continuously and dynamically (they would be adjusted based on input to the sensor, as opposed to older systems which shape the intensity profile of the beam following a presupposed distribution requirement.) The AABH system will also sense taillights of a vehicle being followed and control those microbeams that would otherwise dazzle or annoy its driver when reflected by a rear-view mirror.

In a typical automotive installation, two AABH units will be mounted on a vehicle, facing forward, just as are conventional headlights. These AABH headlights will operate at maximum intensity at all times. An imaging sensor (such as a video camera) faces forward, boresighted with the headlight. The output of the sensor is connected to the controller. The controller module uses the sensor spatial data (video) to determine whether there are illumination sources (headlights or tail lights) present in the headlight's field-of-view, determines their location relative to the Adaptive Anti-Blinding Headlights beam, and uses these data to control the Illuminator. When an oncoming vehicle's headlights are detected (whether or not it is equipped with the AABH system), an area slightly wider than the headlight spacing and approximately six feet high, and whose bottom edge is centered on the oncoming headlights, is dimmed in the beam-bundle of the vehicle equipped with the AABH system. As the positions of both vehicles move, the blanked area tracks the location of the oncoming vehicle, dynamically varying in position and in size. Multiple vehicles (light sources) are accommodated simultaneously by the system. In normal operation, no intervention by the driver is needed, although a manual override will be provided. The system will be designed to be fail-safe; if there is a control system failure, the default illumination level will be the equivalent of today's low beams. Note that each headlight has its own independent AABH system. If one failed, the other would still provide substantially improved illumination. Moreover, the AABH headlight itself is used as the reference to determine the position of the microbeams. A slight misalignment of the AABH headlight assembly (as caused, say, by a minor accident) will not cause oncoming drivers to be dazzled because of misplacement of the masked beams.

From the viewpoint of the driver of an automobile equipped with AABH, it will be like having bright high beams on at all times but without concern that the other motorists within the extent of his headlight beam will be dazzled. From the viewpoint of the driver ahead, whose vehicle need not be equipped with AABH to confer this benefit, it will be like looking at an automobile's headlights from an angle far off that of the center ray. They will appear to be glowing discs of light. This enables the driver to ascertain the location of AABH-equipped oncoming vehicles but will not cause glare.

SUMMARY, SCOPE, RAMIFICATIONS

Thus, the reader will see that the AABH system enables the driver to have the equivalent of high beam headlights or brighter on at all times, greatly enhancing the ability to see at night. It protects oncoming drivers and drivers being followed (who need not be equipped with an AABH system) from being subjected to glare. This will improve their comfort and, more importantly, their visual recovery time. If the vehicle equipped with it is heavily loaded, or is cresting hills, the AABH system will compensate for the changes in attitude based on where the beam impinges on the other cars, not on some arbitrary reference point. It tolerates small maladjustments caused by shock, vibration, or even the possible incompetence of the technician who adjusts it. It provides all of these functions automatically, without driver intervention.

The result of these improvements will be greater safety for those driving at night. The benefits will be greatest when most vehicles are equipped with this system, but even the first drivers using it will benefit as will those drivers ahead of them at night. Less important, but still highly significant, is the increased comfort to all drivers involved. The reduction in stress in itself should also contribute to safer driving, not only because of decreased fatigue resulting from stress but also because a relaxed driver is less likely to be aggressive. The National Highway Transport Safety Administration has identified the older driver as one who is especially affected by glare. Although everyone will benefit, these people may be helped the most.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An anti-blinding illumination system, comprising:
   (a) a sensor for detecting the presence of at least one predetermined object within an illumination beam,
   (b) a controller for processing data from the sensor,
   (c) a light source having multiple narrow angle microbeams making up said illumination beam, said source being capable of being controlled so as to selectively reduce the intensity of individual microbeams in its beam,
      said controller providing feedback to cause the intensity of the selected microbeams to be reduced in response to said predetermined object, whereby said illumination beam having a high level of illumination is in operation at all times, with only selected portions of the illumination beam being reduced by said controller.

2. The anti-blinding illumination system as set forth in claim 1 wherein said sensor is a device selected from the group consisting of video cameras and imaging optical sensors.

3. The anti-blinding illumination system as set forth in claim 1 wherein said sensor is a device selected from the group consisting of radio-frequency and optical radar.

4. The anti-blinding illumination system as set forth in claim 1 wherein said light source includes an array of individual, independently controllable microbeam sources selected from the group consisting of light-emitting diodes, lasers, incandescent lamps, arc lamps and electroluminescent lamps, and a spatial light modulator selected from the group consisting of digital mirror devices, liquid crystal devices, and grating light valves for selectively controlling the intensity of individual microbeam sources in said array.

5. The anti-blinding illumination system as set forth in claim 1 wherein said light source includes an array of individual independently controllable microbeam sources selected from the group consisting of light-emitting diodes, lasers, incandescent lamps, arc lamps and electroluminescent lamps.

6. A method for enabling drivers of vehicles to obtain the benefits of bright headlights while simultaneously preventing drivers of vehicles being followed and drivers of oncoming vehicles from being blinded by rays of light emanating from these headlights, including the steps of:
   (a) detecting the presence of an oncoming or followed vehicle in an area of illumination provided by multiple rays of light from the headlights;
   (b) determining the coordinates of said oncoming or followed vehicle in said area of illumination;
   (c) determining, from the detected presence of the oncoming or followed vehicle and its coordinates; the shape, size and location of an area to be darkened within said area of illumination;
   (d) determining which of said multiple rays of light must be extinguished to darken such area; and
   (e) controlling individual rays of light from the headlights to darken the determined area within said area of illumination by producing a desired output pattern of the individual rays from the headlights.

* * * * *